3,051,698
CELLULOSE PRODUCTS AND PROCESS FOR MAKING SAME

Lee H. Elizer, Glen C. Glasscock, and John M. Seitz, Keokuk, Iowa, assignors to The Hubinger Company, Keokuk, Iowa, a corporation of Iowa
No Drawing. Filed June 22, 1959, Ser. No. 821,675
23 Claims. (Cl. 260—212)

This invention relates to new substituted cellulose derivatives and to processes for making them.

The object of this invention is to provide new cationic, nitrogenated cellulose derivatives.

Another object is to provide new methods for making said cationic, nitrogenated cellulose derivatives.

Still another object is to provide cationic, nitrogenated cellulose derivatives which possess marked affinity for acid or wool-type dyes as well as for other anionic conditioning or coating compositions, such as anionic resins and starches.

Other objects and advantages will become obvious from the following description.

We have discovered that when cellulose, both natural and regenerated, such as cellophane, viscose rayon and the like, and cellulose derivatives, such as cellulose esters of fatty acids, and cellulose xanthate, are treated with an aqueous alkaline solution of cyanamide, they react to form new cationic nitrogenated products. These nitrogenated products, when treated with an acid, form stable cationic acid salts. The aqueous alkaline cyanamide solution can be prepared by dissolving cyanamide in a solution of an alkali or alkaline earth metal base or by dissolving an alkali or alkaline earth metal cyanamide in water.

It will be understood that both in the specification and claims, the alkali metal and alkaline earth metal cyanamides include both the completely metallated cyanamide, such as CaNCN and $Na_2NCN$, and the metal hydrogen cyanamides, such as $Ca(HNCN)_2$ or NaHNCN.

Conditions essential for the desired reaction include an aqueous solvent medium and an alkaline reaction mixture. For appreciable nitrogen add-on and cationicity, the pH should be above 7, preferably at least about pH 8.5 and preferably in the range of about 10 to 12.5.

Reaction of the cellulose or cellulose derivative with the cyanamide occurs at any temperature from the freezing to the boiling points of the reaction mixture. In general, reaction rate increases with increasing temperature. Thus for very rapid nitrogenation, the temperature can be elevated, as, for example to about 200° F. However, digestion periods at such elevated temperatures are desirably shortened since, after a point of maximum substitution at the given reagent concentration, decomposition or rearrangement sets in, as demonstrated by some nitrogen loss.

Other conditions, such as the ratio of the cyanamide to the cellulosic material, the concentration of cyanamide dissolved in the reaction mixture, and the period of reaction, are not critical, although they do influence the extent of nitrogen substitution. For example, higher ratios of total cyanamide to the cellulosic material tend to increase the degree of substitution.

The precise nature of the reaction mechanism or of the substituent nitrogen-containing radicals is not yet completely understood. It is likely that reactive hydroxyl groups of the cellulose or cellulose ester participate in the reaction. In the case of cellulose esters, such as cellulose acetate, such free hydroxyl groups can be initially present or can be produced by hydrolysis under the alkaline conditions of the reaction. When an alkali metal or alkaline earth metal cyanamide is dissolved in water or when cyanamide is dissolved in an aqueous alkaline solution, the $(HNCN)^-$ ion is formed. We consider it probable that this ion is the reactive agent. It will be understood, however, that the invention is not to be restricted by the foregoing hypothesis.

As aforementioned, the aqueous cyanamide treatment is effective with cellulose in its natural or regenerated forms, with fatty acid esters of cellulose, such as cellulose acetate, cellulose propionate, cellulose butyrate and mixed esters, such as cellulose acetate propionate and cellulose acetate butyrate, and with cellulose xanthate. The cellulosic material can be treated in any desired physical form, as, for example, in the form of a fiber, pulp, or granule slurry, woven cloth, paper sheets, or plastic films. The cellulose can be derived from any source such as wood, cotton, straw, pith, and the like. Cellulose xanthate can be treated in solution.

The nitrogen-containing reagent, as previously stated, is cyanamide dissolved in an aqueous alkaline solution, preferably of an alkali metal or alkaline earth metal base, such as sodium, potassium, lithium, calcium, barium or strontium hydroxide, or their basic salts, or an aqueous solution of an alkali metal or alkaline earth metal cyanamide, such as sodium, potassium or calcium cyanamide. It is ordinarily not necessary to add a base to a solution of the cyanamide salt since solutions of such salts in water are generally sufficiently alkaline. An aqueous solution of calcium cyanamide, for example, generally has a pH in the range of about 10.5 to 11.9. An alkali metal or alkaline earth metal cyanamide hydrolyzes in water to form a solution which is substantially similar to an aqueous solution of cyanamide in an alkaline solution of an alkali metal or alkaline earth metal base. In general, we prefer to employ calcium cyanamide because of its availability, low cost, and high efficiency.

The reaction mixture containing the cellulosic material is maintained at the desired reaction temperature for a sufficient length of time to obtain the desired degree of nitrogen substitution. Reaction occurs at a substantial rate at reduced to ordinary temperatures. This is an advantage where elevated temperatures are either unfeasible or undesirable. For more rapid reaction rates, the reaction temperature can be increased. There is ordinarily no economic advantage in continuing the reaction period beyond the point at which the desired or maximum degree of substitution is achieved. In some cases, particularly at elevated temperatures, there may be some loss of substituted nitrogen with prolonged treatment, although a cationic, nitrogenated product is still obtained.

The cationic, nitrogenated cellulosic products can be separated from the alkaline reaction mixture, washed, dried, and employed as such. They can also be acidified to form the cationic acid salts, which, in many cases, are preferred as, for example, where the cellulosic product is to be dyed with an acid dye salt.

The acid salt derivatives can be prepared from the washed and dried nitrogenated products by treating them with an aqueous solution of the desired acid. Ordinarily, they are most conveniently prepared by acidification of the alkaline reaction mixture with the particular acid, the derivative of which is desired. The pH is preferably reduced to 4 or less, in some cases, to as low at 1. Where operational expediency requires that the cyanamide reaction period be short, it may be desirable to dry the treated cellulosic deriative, without washing prior to acidification since this increases the nitrogen add-on.

Substantially any acid can be used, including inorganic and organic acids, such as hydrochloric, nitric, sulphuric, sulfurous, phosphoric, acetic, propionic acids, and the like. In general, we prefer to employ hydrochloric acid.

The acidification treatment can be carried out at reduced, ambient or elevated temperatures, as, for example, the temperature of the initial nitrogenation reaction. After the acid treatment is completed, the nitrogenated cellulose product acid salts can be removed from the reaction mixture, washed, and dried in any convenient manner.

The cationic, nitrogenated, cellulose derivatives possess the dyeing properties of wool and can readily be dyed with acid dyestuffs such as light green SF yellowish (C.I. 670, Merck Index, 6th Edition, page 573), acid fuchsine (C.I. 692, trisodium salt of the trisulfonic acid of parafuchsine), eosin Y (C.I. 768, disodium salt of 2,4,5,7-tetrabromo - 9 - O - carboxyphenyl - 6 - hydroxy - 3 - isoxanthone), orange G (C.I. 27, disodium salt of 1-phenyl-azo-2-naphthol-6,8-disulfonic acid), and the like.

The cationic cellulose derivatives are also substantive to anionic treating and coating compositions, such as anionic emulsions of urea-formaldehyde, melamine-formaldehyde, polystyrene, acrylic resins, vinyl resins, rubber, rosin, and the like. Starch sizing is also improved.

Paper furnish such as sulfate, soda, sulfite or groundwood pulp, can be treated with cyanamide directly in the beater and, thereby, provides a highly advantageous means for improving the retention of rosin and starch size and other polymeric compositions added to impart such properties as wet strength and water resistance to the paper.

Cotton and viscose rayons can be treated in form of fiber, yarn or cloth by immersion in the cyanamide reaction solution. Regenerated cellulose in sheet or film form, such as cellophane, can similarly be modified. The cellulose esters, such as cellulose acetate, can be treated in granule, fiber, yarn, woven cloth or film form.

EXAMPLE 1

Part I 90 grams of calcium cyanamide were slurried in 300 mls. of water for 15 minutes at 78° F. The solution was filtered, the filter cake washed with 200 mls. of water, and the washings added to the filtrate. The filtrate was acidified with cool 20% sulfuric acid to a pH of 5.0. The precipitated calcium sulfate was filtered off and washed with 50 mls. of water, the washings being added to the solution of cyanamide. The cyanamide solution was divided into 4 equal portions labelled A, B, C, and D, into each of which was introduced 18 grams of sliver cotton (Scientific Products 61453A). The pH of each test mixture was adjusted as follows:

A to pH 11.6 with NaOH
B to pH 9.6 with NaOH
C as is pH 5.0
D to pH 3.6 with HCl All samples were maintained at 78° F. for 24 hours, at which time the pH of each was reduced to 2.0 with HCl and the samples filtered and washed. A portion of each sample was treated with an acid dye, Light Green SF yellowish (C.I. 670) to determine cationicity and substantivity, washed and dried.

|  | A | B | C | D | Untreated cotton |
|---|---|---|---|---|---|
| pH reaction slurry after 24 hours | 11.7 | 9.8 | 5.3 | 3.5 |  |
| $N_2$ percent, dry basis | 0.167 | 0.071 | 0.038 | 0.038 | 0.030 |
| Dye results | Bright green. | Light green. | None | None | None |

It will be noted that nitrogen add-on when the cyanamide digestion was carried out at acid pH was negligible and there was no appreciable substantivity to an acid dye.

Part II

Reaction mixtures prepared similarly to A above were digested at 32° F. for the indicated time intervals.

|  | 24 hrs. | 48 hrs. | 72 hrs. |
|---|---|---|---|
| $N_2$ percent, D.B. | 0.093 | 0.124 | 0.171 |

All 3 of these samples dyed well with C.I. 670, the color becoming progressively deeper as the percent of nitrogen add-on increased.

EXAMPLE 2

Part I 3 strips of muslin fabric (25 gms./strip) were immersed and squeezed 6 times in solution of $Ca(HNCN)_2$ containing 0.5 mol/liter, and placed in a covered beaker at 78° F. for 4 hours. 100 mls. of distilled water were added to each of the 3 strips, A, B and C. The pH of strip B was adjusted to 7.0 and that of strip C to 3.7 with HCl. All 3 strips were then washed and dried. Portions of each of the 3 strips were dyed with a 0.1% solution of C.I. 670, washed and dried.

|  | Control | A | B | C |
|---|---|---|---|---|
| $N_2$ percent, D.B. | 0.02 | 0.09 | 0.10 | 0.12. |
| Dye results | None | Light green. | Light green. | Deep green. |

This data demonstrates the improved take up of an acid dye salt by the cationic HCl salt of the nitrogenated cellulose fabric C as compared with that of the cationic nitrogenated parent derivatives, A and B

Part II 100 mls. of 0.5 molar $Ca(HNCN)_2$, pH 11.8, were poured into each of 7 beakers and the pH adjusted as shown below. One each of 7 muslin strips was wetted and squeezed in each of the solutions, and placed in a covered beaker for 4 hrs. at 78° F. 100 mls. of water were added to each beaker and adjusted to pH 3.7. The strips were then washed, dried, and a portion of each dyed with a 0.01% solution of C.I. 670, washed and dried.

| pH | 11.8 | 9.6 | 7.0 | 6.0 | 5.0 | 3.7 | 2.0 |
|---|---|---|---|---|---|---|---|
| Percent $N_2$, D.B. | 0.20 | 0.15 | 0.02 |  |  |  |  |
| Dye | Deep green. | Medium green. | None | None | None | None | None |

Part III

Strips of muslin were treated with solutions of $$Ca(HNCN)_2$$

at pH 11.8 at the temperatures and for the time intervals set out below, with the pH subsequently adjusted to 3.7 with HCl, using the procedure described in Part II, and dried with 0.01% solutions of C.I. 670.

|  | 78° 5 min. | 78° 1 hr. | 78° 24 hrs. | 200° 1 hr. | 32.5° 24 hrs. |
|---|---|---|---|---|---|
| Percent $N_2$,D.B. | 0.026 | 0.041 | 0.210 | 0.10 | 0.05. |
| Dye | None | light green. | deep green. | deep green. | medium green. |

EXAMPLE 3

100 gms. of desized muslin fabric were immersed in 400 mls. of an aqueous extract containing 0.525 mole of calcium cyanamide for 16 hrs. at 78° F. The pH was adjusted to 2.0 with HCl and the fabric washed, dried and dyed with C.I. 670. The percent $N_2$ of the untreated control was 0.02% and that of the cyanamide treated sample 0.45%. The control did not dye whereas the treated fabric dyed a deep, uniform green.

EXAMPLE 4

Part I 90 gms. of sulfite pulp were slurried in 500 mls. of water which was divided into 5 equal parts. pH of the slurry was 5.2. 90 gms. of hydrated grade calcium cyanamide were slurried in 300 mls. of water for 15 min. at 78° F. and filtered. The filter cake was washed with 200 mls. of water and the washings added to the filtrate. The calcium cyanamide extract was divided into 5 equal portions labelled A, B, C, D and E. A was added to one of the sulfite pulp portions without adjustment of the 11.3 pH. The pH of B, C, D and E was adjusted with HCl to 9.6, 7.0, 3.7 and 2.0 respectively and the sulfite portions added. After 24 hrs. at 78° F., all samples were taken to pH 2.0 with HCl, filtered, washed and dried.

|  | Sulfite Pulp | A | B | C | D | E |
|---|---|---|---|---|---|---|
| pH after 24 hrs | | 11.9 | 10.4 | 9.2 | 4.7 | 2.6 |
| Percent $N_2$, D.B | 0.00 | 0.26 | 0.14 | 0.03 | 0.02 | 0.01 |

Substantial reaction in this case occurred only at a pH above 10. A dyed a deep green with C.I. 670, B dyed slightly and the others not at all.

Part II

Runs similar to I-A were repeated except that digestions were carried out at the temperatures and time periods set out below.

|  | 200° F. | | | 32.5° F. | | |
|---|---|---|---|---|---|---|
|  | (1) 5 min. | (2) 1 hr. | (3) 20 hrs. | (4) 24 hrs. | (5) 48 hrs. | (6) 72 hrs. |
| Percent $N_2$, D.B | 0.154 | 0.105 | 0.039 | 0.073 | 0.077 | 0.080 |

(1) and (5) dyed a medium light green. (2), (4) and (6) dyed lightly. (3) did not dye.

EXAMPLE 5

Part I

The procedure was similar to that of Example 5, Part I, except that an aged alkali treated sulfite pulp prepared as follows was employed. 100 gms. of sulfite pulp were digested with 18% NaOH at 73° F. for 1 hr. The caustic was poured off and the pulp pressed to a weight of 300 gms. It was then shredded and aged for 65 hrs. in sealed jars at 73° F. The treated pulp was divided into 5 portions; pH was adjusted with HCl; and calcium cyanamide solution added.

|  | Pulp | A | B | C | D | E |
|---|---|---|---|---|---|---|
| pH after 24 hr | | 11.7 | 10.9 | 7.2 | 3.9 | 2.1 |
| Percent $N_2$, D.B | 0.000 | 0.145 | 0.149 | 0.054 | 0.002 | 0.001 |

A and B dyed a medium light green, the others not at all.

Part II

Runs similar to I-A were made at different temperatures and for different time intervals.

|  | 200° F. | | | 32.5° F. | | |
|---|---|---|---|---|---|---|
|  | (1) 5 min. | (2) 1 hr. | (3) 20 hrs. | (4) 24 hrs. | (5) 48 hrs. | (6) 72 hrs. |
| Percent $N_2$, D.B | 0.220 | 0.158 | 0.027 | 0.144 | 0.249 | 0.158 |

(1), (4), (5) and (6) dyed deep green. (2) dyed a medium green. (3) did not dye.

EXAMPLE 6

The following pulps were obtained from the beater of a paper mill and partially dewatered.

|  | Oak Chip | Kraft | Straw | Waste Paper |
|---|---|---|---|---|
| O.D. solids, percent | 37.6 | 23.8 | 17.3 | 21.8. |
| Ash percent, D.B | 2.9 | 0.2 | 6.2 | 2.3. |
| Nitrogen percent, D.B | 0.097 | 0.000 | 0.211 | 0.051. |
| Color | Light Brown. | White | Dark Brown. | Dark Brown. |

18 gms. D.B. (dry basis) of each of the pulps were diluted with 1000 mls. of water. 12 gms. CaNCN were added to the straw pulp and the waste paper pulp. The extract obtained by digesting 12 gms. CaNCN in 200 mls. of water plus 125 mls. of water used to wash the filter cake was employed with the oak chip pulp and the kraft pulp.

| Product | Oak Chip | Kraft | Straw | Waste |
|---|---|---|---|---|
| Temperature | 78° F | 78° F | 200° F | 78° F | 78° F | 78° F. |
| Time | 5 Min | 24 hrs | 5 Min | 48 hrs | 5 Min | 5 Min. |
| Percent $N_2$, D.B. | 0.227 | 0.278 | 0.097 | 0.149 | 0.240 | 0.144. |
| Dye, C.I. 670 | Medium green. | Medium green. | Light green. | Deep green. | Deep green. | Deep green. |

EXAMPLE 7

The cellulose nitrate coating was peeled from a sheet of cellophane by immersing in water for 10 min. at 120° F. 10 gms. of the viscose sheet were immersed in 460 mls. of a solution containing 0.704 mole of calcium cyanamide. After 16 hrs. at 78° F., the pH was adjusted to 2.0 with HCl. The treated film was washed and a portion dyed by immersion in 0.01% C.I. 670. The film dyed a deep, clear green. A portion of the untreated sheet did not dye at all.

EXAMPLE 8

The cellulose nitrate coating was removed from 9 sheets of cellophane and the 10 gm. sheets were labelled A, B, C, D, E, F, G, H and I. 200 gms. CaNCN were slurried in 1 liter of water at 100° F. and filtered. The filtrate, 946 mls., pH 10.9, contained 1.47 moles of the cyanamide.

Sheet F was immersed for 5 min. in 50 mls. of the cyanamide filtrate which had been adjusted to pH 3.0 with HCl, removed and dried at 78° F. Sheet I was similarly processed except that the pH of the cyanamide solution had been adjusted to 7.0. Both F and I were then immersed in an aqueous HCl solution, pH 2, washed, and dried at 78° F.

The other 7 sheets were immersed in 846 mls. of the solution at 78° F. containing 1.305 moles of the cyanamide. After 5 minutes sheets A, B, C, D, E were removed from the bath. Sheet A was immediately plunged into a bath of distilled water adjusted to pH 2.0 with HCl. After 1 hour, the sheet was washed and dried at 78° F. Sheet B was dried at 200° F. to an oven dry solids content of approximately 95% and processed as in A. Sheet C was dried to an O.D. solids content of 95%, at 78° F. and processed as in A. Sheet D was dried to an O.D. solids content of 95% at 32.5° F., and processed as in A. Sheet E was dried to an O.D. solids content of 95% at 78° F., washed without pH adjustment, then dried at 78° F. to O.D. solids content of 95%. Sheets G and H were allowed to soak 4 hours in the cyanamide solution at the 10.9 pH, then removed, sheet G was dried at 200° F. to an O.D. solids content of 95% and sheet H at 78° F. to an O.D. solids content of 95%. Then, both sheets were processed as in A.

A small portion of each sheet was immersed in 0.01% concentration of the acid dye Light Green SF, yellowish C.I. 670, then washed in distilled water and air dried.

|  | Blank | A | B | C | D | E | F | G | H | I |
|---|---|---|---|---|---|---|---|---|---|---|
| Percent $N_2$, D.B. | 0.009 | 0.100 | 0.607 | 0.587 | 0.292 | 0.607 | 0.080 | 0.690 | 0.940 | 0.088 |
| Dye | None | None | deep green. | deep green. | deep green. | None | None | deep green. | deep green. | None |

Sheets A and C were similarly processed except that C was dried after immersion of the cyanamide solution prior to acidification. The results indicate that the short 5 minute cyanamide treatment can be adequate if the solution is dried on the cellulose prior to formation of the acid salt.

Sheet E, though cationic, as indicated by other tests, was not in the form of the acid salt and, therefore, did not react with the acid dye salt.

Sheets F and I were processed like C except for treatment with acid and neutral cyanamide solutions respectively. Nitrogen add-on was negligible and the sheets were not cationic.

EXAMPLE 9

18 gms. of cellulose acetate powder (Du Pont WA 526-X-P, percent acetyl 38.49, D.S. 2.32) slurried in 100 mls. of water were added to 100 mls. of a solution of calcium cyanamide prepared by extracting 90 gms. with 500 mls. of water. pH of the mixtures was 10.4. After treatment at the temperatures and for the times indicated, the pH was reduced to 2.0 with HCl. The treated cellulose acetate was then filtered, washed and dried.

|  | Blank | 78° F. 24 hrs. | 200° F. | | 32.5° F. | |
|---|---|---|---|---|---|---|
|  |  |  | 5 min. | 1 hr. | 24 hr. | 48 hr. |
| Percent $N_2$, D.B. | 0.000 | 0.074 | 0.072 | 0.083 | 0.095 | 0.098 |
| Dye, C.I. 670 | None | medium green. | medium green. | medium green. | medium green. | medium green. |

The acetyl content of a sample treated at 32.5° F. for 72 hours, nitrogen add-on 0.177%, was 29.00%, indicating a substantial degree of hydrolysis.

EXAMPLE 10

A similar procedure was employed as in Example 9, except that the cellulose acetate powder used was Du Pont Z-a558-35-p, percent acetyl 40.42, D.S. 2.52.

|  | Blank | 78° F., 24 hrs. | 200° F. | | 32.5° F. | |
|---|---|---|---|---|---|---|
|  |  |  | 5 min. | 1 hr. | 24 hrs. | 48 hrs. |
| Percent $N_2$, D.B. Dye | 0.000 none | 0.050 deep green. | 0.068 deep green. | 0.076 deep green. | 0.071 deep green. | 0.085. deep green. |

The acetyl content of a sample treated at 32.5° F. for 72 hours, nitrogen add-on 0.09%, was 29.80%, indicating a substantial degree of hydrolysis.

Regenerated cellulose can be cationically nitrogenated with the cyanamide very conveniently during an intermediate stage in processing, by addition of the cyanamide to the xanthate. Upon acidification, the xanthate decomposes to form a cationic acid salt of a nitrogenated cellulose.

EXAMPLE 11

100 gms. of sulfite pulp were mixed with 18% NaOH and allowed to stand for 1 hr. at 73° F. The caustic was then poured off and the pulp pressed to a weight of 300 gms. The press cake was shredded and allowed to age for 65 hrs. in a sealed jar at 73° F. 32 gms. $CS_2$ were added to form the xanthate and the mixture shaken for 3 hrs. at 78° F. The material was divided into 2 equal portions.

84.5 gms. 18% NaOH and 382 mls. water were added to portion A and stirred for 2 hrs.

25 gms. CaNCN were slurried in 500 mls. water for 30 min. at 78° F. 21 gms. $Na_2CO_3$ were added. The mixture was stirred for 5 min. and filtered. The filtrate, 470 mls., was added to portion B and the mixture stirred for 2 hrs. A and B were stored at 73° F. for 16 hrs.

200 mls. of A and B were each poured into 200 mls. of water containing 50 mls. glacial acetic acid. The nitrogenated, regenerated cellulose acid salt was filtered, washed and air dried.

|  | A | B |
|---|---|---|
| Percent $N_2$, D.B. | 0.00 | 0.12. |
| Dye, C.I. 670 | none | deep green. |

Although this invention has been described with reference to illustrative embodiments thereof, it will be apparent to those skilled in the art that the principles of this invention can be embodied in other forms but within the scope of the claims.

We claim:
1. A process for making a cationic nitrogenated cellulose product which comprises reacting a cellulosic material selected from the group consisting of cellulose, fatty acid esters of cellulose, and cellulose xanthate with an aqueous alkaline solution of cyanamide.

2. A process for making a cationic nitrogenated cellulose product which comprises reacting a cellulosic material selected from the group consisting of cellulose, fatty acid esters of cellulose, and cellulose xanthate with an aqueous alkaline solution of a metal salt of cyanamide, the metal being selected from the group consisting of alkali and alkaline earth metals.

3. The process of claim 2 in which the metal cyanamide salt is calcium cyanamide.

4. A process for making a cationic nitrogenated cellulose product which comprises reacting a cellulosic material selected from the group consisting of cellulose, fatty acid esters of cellulose, and cellulose xanthate with an aqueous alkaline solution of cyanamide and then acidifying the reaction mixture.

5. A process for making a cationic nitrogenated cellulose product which comprises reacting a cellulosic material selected from the group consisting of cellulose, fatty acid esters of cellulose, and cellulose xanthate with an aqueous alkaline solution of a metal salt of cyanamide, the metal being selected from the group consisting of alkali and alkaline earth metals, and then acidifying the reaction mixture.

6. The process of claim 5 in which the metal cyanamide salt is calcium cyanamide.

7. The process of claim 4 in which the acid is hydrochloric acid.

8. The process of claim 4 in which the cellulosic material is separated from the cyanamide solution and dried without washing prior to acidification.

9. The process of claim 4 in which the cellulosic material is cotton.

10. The process of claim 4 in which the cellulosic material is paper pulp.

11. The process of claim 4 in which the cellulosic material is regenerated cellulose.

12. The process of claim 4 in which the cellulosic material is cellulose acetate.

13. The process of claim 9 in which the aqueous alkaline solution of cyanamide is prepared by dissolving calcium cyanamide in water.

14. The process of claim 10 in which the aqueous alkaline solution of cyanamide is prepared by dissolving calcium cyanamide in water.

15. The process of claim 11 in which the aqueous alkaline solution of cyanamide is prepared by dissolving cyanamide in water.

16. The process of claim 12 in which the aqueous alkaline solution of cyanamide is prepared by dissolving calcium cyanamide in water.

17. The cationic, nitrogenated reaction product of a cellulosic material, selected from the group consisting of cellulose, the fatty acid esters of cellulose, and cellulose xanthate and an aqueous alkaline solution of cyanamide.

18. The acid salt produced by acidification of the reaction product of claim 17.

19. The product of claim 18 in which the cellulosic material is cotton.

20. The product of claim 18 in which the cellulosic material is paper pulp.

21. The product of claim 18 in which the cellulosic material is regenerated cellulose.

22. The product of claim 18 in which the cellulosic material is cellulose acetate.

23. The product of claim 18 in which the acid salt is the hydrochloride.

References Cited in the file of this patent

UNITED STATES PATENTS

| | | |
|---|---|---|
| 2,015,104 | Dreyfuss | Sept. 24, 1935 |
| 2,332,049 | Bock et al. | Oct. 19, 1943 |
| 2,338,681 | Bock et al. | Jan. 4, 1944 |
| 2,339,739 | Blackshaw et al. | Jan. 18, 1944 |
| 2,446,682 | Whitner | Aug. 10, 1948 |
| 2,538,903 | Gaver et al. | Jan. 23, 1951 |
| 2,894,944 | Paschall | July 14, 1959 |

FOREIGN PATENTS

| | | |
|---|---|---|
| 508,977 | Canada | Jan. 11, 1955 |

UNITED STATES PATENT OFFICE
CERTIFICATE OF CORRECTION

Patent No. 3,051,698                      August 28, 1962

Lee H. Elizer et al.

It is hereby certified that error appears in the above numbered patent requiring correction and that the said Letters Patent should read as corrected below.

Column 5, line 58, for "Example 5" read -- Example 4 --.

Signed and sealed this 5th day of February 1963.

(SEAL)
Attest:

ERNEST W. SWIDER                      DAVID L. LADD
Attesting Officer                       Commissioner of Patents